(12) United States Patent
Candy (10) Patent No.: US 7,924,012 B2
(45) Date of Patent: Apr. 12, 2011

(54) METAL DETECTOR HAVING CONSTANT REACTIVE TRANSMIT VOLTAGE APPLIED TO A TRANSMIT COIL

(75) Inventor: Bruce Halcro Candy, Basket Range (AU)

(73) Assignee: Minelab Electronics Pty Ltd., Torrensville (AU)

( * ) Notice: Subject to any disclaimer, the term of this patent is extended or adjusted under 35 U.S.C. 154(b) by 122 days.

(21) Appl. No.: 12/373,046

(22) PCT Filed: Jul. 12, 2007

(86) PCT No.: PCT/AU2007/001072
§ 371 (c)(1),
(2), (4) Date: Jun. 2, 2009

(87) PCT Pub. No.: WO2008/006178
PCT Pub. Date: Jan. 17, 2008

(65) Prior Publication Data
US 2010/0019769 A1    Jan. 28, 2010

(30) Foreign Application Priority Data

Jul. 12, 2006    (AU) ................................ 2006903737

(51) Int. Cl.
*G01V 3/10* (2006.01)
(52) U.S. Cl. ....................................................... 324/329
(58) Field of Classification Search .................. None
See application file for complete search history.

(56) References Cited

U.S. PATENT DOCUMENTS

| 4,942,360 | A | 7/1990 | Candy |
| 5,537,041 | A | 7/1996 | Candy |
| 5,729,143 | A | 3/1998 | Tavernetti et al. |
| 6,636,044 | B2 | 10/2003 | Candy |
| 6,653,838 | B2 | 11/2003 | Candy |

FOREIGN PATENT DOCUMENTS

WO    WO 2005/047932    5/2005

*Primary Examiner* — Jay M Patidar
(74) *Attorney, Agent, or Firm* — Beyer Law Group LLP (57) ABSTRACT

An electronic metal detector having, a transmit coil arranged and adapted to transmit an alternating magnetic field associated with a reactive transmit coil voltage, the transmit coil being connected to transmit electronics arranged and adapted to generate a transmit signal, the transmit electronics having at least two power sources, a first power source and a second power source, wherein the first power source is adapted and arranged to connect to the transmit coil for at least a first period, and the second power source is adapted and arranged to connect to tie transmit coil for at least a second period, the said transmit electronics including at least one servo control negative feedback loop, a first servo control negative feedback loop, which is adapted and arranged to monitor a transmit coil current for at least part of the said first period, and to control at least part of the said transmit signal, the transmit electronics being adapted and arranged to control the transmit signal to produce the reactive transmit coil voltage to be approximately constant and approximately equal to zero while the transmit coil current is non-zero and approximately constant for at least part of the first period; and receive electronics which are adapted and arranged to receive and process a receive magnetic field during at least some of the first period to produce an indicator output.

23 Claims, 5 Drawing Sheets

METAL DETECTOR HAVING CONSTANT REACTIVE TRANSMIT VOLTAGE APPLIED TO A TRANSMIT COIL

TECHNICAL FIELD

This invention relates to a metal detector which transmits at least some periods of constant reactive transmit coil voltage equal to approximately zero whilst the transmit coil current is non-zero, and a method of assisting accuracy of this constant reactive voltage generation.

This transmission has particular application to metal detectors which are to operate in environments which may contain magnetic soils, are to be insensitive to transmit induced magnetic signals from such soils, including effects of such soils modulating the inductance of the transmit coil and also including varying soil magnetic coupling of transmit coil with a receive coil, whilst the metal detector is to produce an indicator output responsive to metal targets.

BACKGROUND

The general forms of most metal detectors which interrogate soils are either hand-held battery operated units, or conveyor mounted units, or vehicle mounted units.

Examples of hand-held products include detectors used to locate gold, explosive land-mines or ordnance, coins and treasure. Examples of conveyor-mounted units include fine gold detectors in ore mining operations. An example of a vehicle-mounted unit is a unit to search for land-mines. These units usually consists of a transmit coil which may transmit an alternating magnetic field associated with a reactive transmit coil voltage, transmit electronics which may generate a transmit signal applied to the transmit coil, and receive electronics which may receive a magnetic field and process received signals to produce an indicator output. The received magnetic field may be detected by a receive coil in most metal detectors, or the transmit coil in some metal detectors such as pulse induction units. The most numerous products of the above examples are the hand-held battery operated products. It is desirable that these have good buried target detection range, especially in magnetic soils which may contain ferrimagnetic materials. Such metal detectors comprise receive electronics which processors a received magnetic field such that the indicator output is responsive to metal targets buried in such soils but not responsive the magnetic soils.

For state-of-the-art metal detectors metal target signals at the limit of the electronic noise produce voltage signals in a receive coil of the order of ten nano Volts. In a metal detector with a "nulled" transmit and receive coil, the varying reactive voltage component from the highly magnetic soils, found in most Australian goldfields for example, may be typically of the order of tens to hundreds of milliVolts across the receive coil. Reactive components are usually symbolised as "X." Resistive soil components, usually symbolised by "R," are typically of the order of a hundred times less than the X component. The R soil component is predictable and thus the R soil component may be nulled as described in the patents in the table. As X is poorly correlated with R in magnetic soils and thus unpredictable, the cancellation of the effects of X is essential in order to accurately null magnetic soil signals. X contamination in a resistive demodulated signal is a problem for any metal detector system which transmits non-zero reactive voltages during resistive synchronous demodulation, such as for example multi-frequency sine-waves. One problem of X contamination of resistive synchronous demodulation is non-linear behaviour of receive electronics. In order that this component is less than the smallest detectable metal target signals, the receive electronics must be accurately linear to an order of $10^6$ to $10^7$. This is difficult and especially difficult at tens of kHz or higher. In order that any absolute "phase" inaccuracy of a metal detector system which transmit non-zero reactive voltages during resistive synchronous demodulation does not significantly impede the cancellation of signals from magnetic soils, the absolute X contamination of the resistive components should be about two orders of magnitude less than the absolute resistive components. Hence, the absolute accuracy of the "phase" needs to be of the order of $10^4$. This too is difficult.

The transmit coil may be approximated as an effective inductive component L, in series with an effective resistive component R, which may for mathematical convenience include resistance of cabling and connectors and some elements of the transmit electronics. Thus the transmit coil plus electronics effective resistance has the effective transmit coil time constant $\tau=L/R$. As $v=Ld(i)/dt$ where v is the transmit coil reactive voltage, if the transmit coil current i is constant, then $v=0$. Thus maintaining the transmit coil current constant for a period results in a zero transmit coil reactive voltage. The applied voltage across the transmit coil is $u=v+iR$. Hence when the transmit coil reactive voltage is zero, the signal applied across the coil including the transmit coil cable resistance and some resistive elements of the transmit electronics is iR. These equations assume transmit coil, cable and electronics with no stray capacitance or parallel resistance. For a given transmit alternating waveform repeating sequence, and for a constant coupling between the transmit coil and the receive coil, the receive coil voltage waveform will be of constant magnitude and form if the transmit coil alternating reactive voltage waveform v(t) is of constant magnitude and form. As i is proportional to 1/L for a constant transmit coil reactive waveform v(t), the transmit coil current waveform i(t) is modulated by 1/L and so too therefore is Ri(t), and $\tau$ too. Thus the applied voltage waveform needs to be modified as the transmit coil inductance is modulated. A method of maintaining a constant reactive transmit coil voltage waveform is described in WO 2005/047932 A1.

Bi-polar transmitting CW systems such as sine-waves and rectangular-waves and examples given below of this invention have an advantage over similar fundamental frequency and power consumption pulse induction systems in that they have intrinsically more gain for signal from targets with long time constants, such as large gold nuggets or unexploded ordnance. For example the resistive component of many CW systems asymptotically decreases as 1/(target time constant) assuming the target has an effective principal time constant, whereas a pulse induction system normally have a response proportional to 1/(target time constant)$^2$.

SUMMARY OF THE INVENTION

This invention addresses these problems by disclosing methods capable of accurately setting the transmit coil reactive voltage v to near zero. The advantage of having $v=0$ during demodulation is that the signal received by the receive electronics is mostly free of X and thus also avoids the significant non-linearities and absolute phase problem described above. This invention discloses a method conducive to high power efficiency, accurate transmit electronics which may generate a transmit signal applied to the transmit coil, which may transmit an alternating magnetic field associated with a reactive transmit coil voltage, such that the transmit signal of the transmit electronics is controlled to produce the reactive transmit coil voltage to be approximately constant and approximately equal to zero whilst a transmit coil current is non-zero and approximately constant for at least a period during which a magnetic field may be received and processed by receive electronics to produce an indicator output which is relatively insensitive to receive signals from magnetic soils, and having relatively high sensitivity to relatively long time constant metal targets compare to comparable pulse induction systems, with possibly reduced sensitivity to environmental magnetic interference and improvement over Australian patent 2006905485.

DETAILED DESCRIPTION

U.S. Pat. Nos. 4,942,360; 5,576,624, 5,537,041; 6,636,044; 6,653,838; and Australian patent 2006905485 describe various means of cancelling signals arising from magnetic soils. This invention is an improvement on these and WO 2005/047932. The table below lists these patents, the method disclosed for each, the relative problems of each method and the relative advantage of this invention.

| Patent | Disclosure | Problems | New advantage |
|---|---|---|---|
| 4,942,360 | Simultaneous multi-frequency with selected receive frequency component linear combinations | Difficulty in linear electronic demodulation. Difficult to set absolute phase reference | Eliminates linear demodulation problem during reception. Phase reference problem effectively eliminated |
| 5,576,624 | Pulse induction with selected receive time domain component linear combinations | Overcomes above problems but relative insensitivity to slow time constant targets. Poor power efficiency | Higher sensitivity to slow time constant targets and more power efficient |
| 5,537,041 | Multi-period rectangular pulses with selected receive time domain component linear combinations | Difficulty in linear electronic demodulation. Difficult to set absolute phase reference | Eliminates linear demodulation problem during reception. Phase reference problem effectively eliminated. |
| 6,636,044 | Improved signal processing signal-to-noise | | Applies to this invention |
| 6,653,838 | Multi-voltage pulse induction | Improved signal-to-noise version of 5,576,624 with same problems | See 5,576,624 |
| 2005/047932 | Constant transmit coil reactive voltage when transmit coil current is non-zero | | Improved transmission method suitable for efficient power consumption and accurate maintenance of constant reactive voltage |
| 2006 905485 | Improved method for magnetic soil signal suppression | | Applies to this invention |

BRIEF DESCRIPTION OF THE DRAWINGS

To assist with the understanding of this invention, reference will now be made to the drawings.

Figure 1:
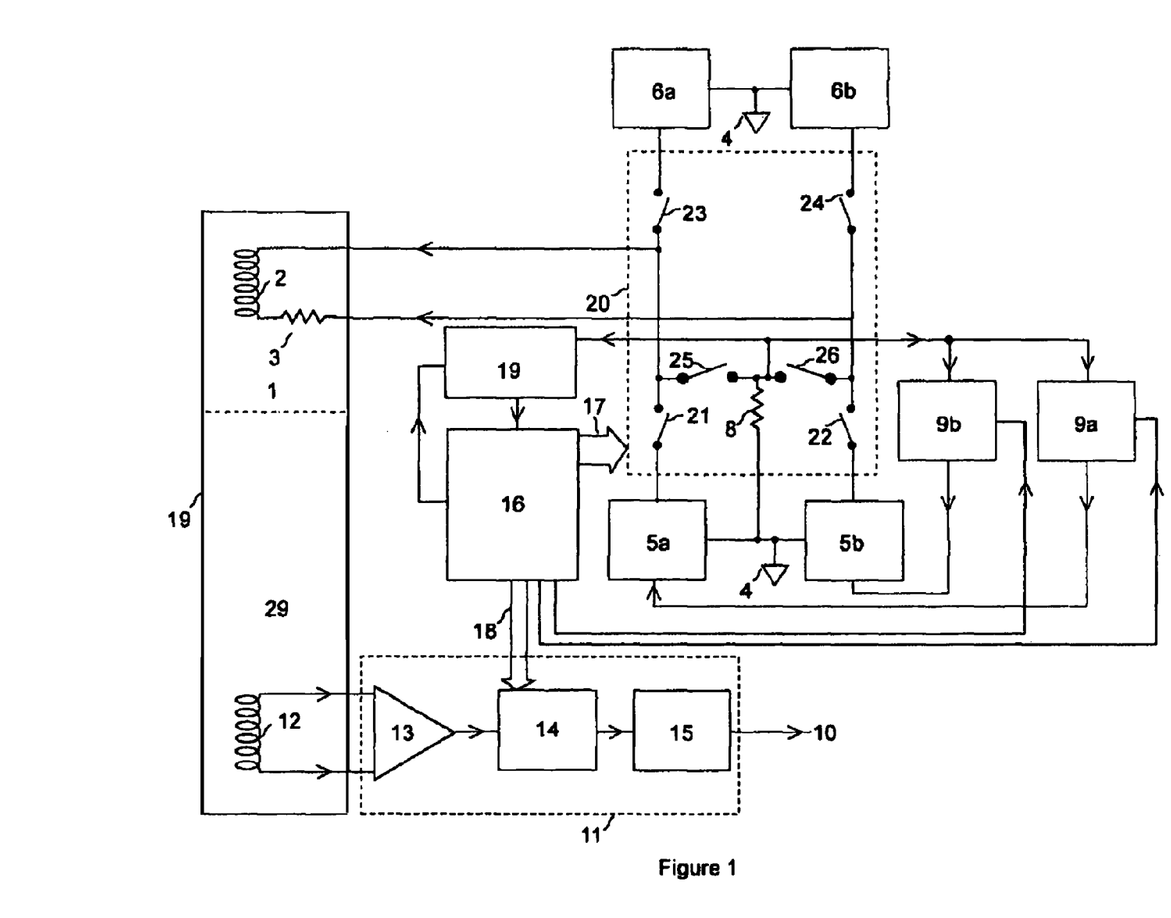
FIG. 1 shows an example of a electronic system capable of producing an approximately constant reactive transmit coil voltage which is approximately equal to zero whilst a transmit coil current is non-zero and approximately constant for at least a first period, and independent of modulation of transmit coil inductance by magnetic soils.

In FIG. 1, transmit coil 1 approximately may be represented by an effective resistive component 3 in series with an effective inductive component 2. This is connected to transmit electronics 4, 5a, 5b, 6a, 6b, 9a, 9b, 16, 17, 19 and 20 which may generate a transmit signal applied to the transmit coil 1. A first power source 5a, connected to the system common ground 4, is connected to switch 21. A third power source 5b, connected to the system common ground 4, is connected to switch 22. Switch 21 and 22 are controlled to be "on" or "off" by timing control electronics 16 via control lines 17. Switch 25 and switch 26 are connected to the system common ground 4 via resistor 8 and to switch 21 and switch 22 respectively to the transmit coil 1, and to switch 23 and switch 24 respectively. Switch 23 is connected to a second power source 6a which is connected to the system common ground 4, and switch 24 is connected to a fourth power source 6b which is also connected to the system common ground 4. Switch 25, switch 26, switch 23, and switch 24 are controlled to be "on" or "off" by timing control electronics 16 via control lines 17. Thus switch 21 connects or "switches" the transmit coil to the first power source 5a, switch 23 switches the transmit coil to the second power source 6a, switch 22 switches the transmit coil to the third power source 5b, switch 24 switches the transmit coil to the fourth power source 6b, switch 25 and switch 26 switch the transmit coil to the system common ground 4 via resistor 8. These switches 21, 22, 23, 24, 25, and 26 and resistor 8 may be said to form switching electronics 20. Resistor 8 is of low resistive value and used for transmit coil current sensing by feeding a voltage across resistor 8 to an input of a first servo loop amplifier 9a, and a third servo loop amplifier 9b and a fourth servo loop amplifier 19. An output of the first servo loop amplifier 9a is connected to a control input of the first power source 5a, such that the first power source 5a, resistor 8, first servo loop amplifier 9a and the said switching electronics 20 form a first servo control negative feedback loop which controls current flowing through resistor 8 to be approximately constant at least during a first period. The outputs of the second power source 6a and the fourth power source 6b are constant voltages, which may be maintained by a shunt regulator or local servo control negative feedback loops. An output of the third servo loop amplifier 9b is connected to a control input of the third power source 5b, such that the third power source 5b, resistor 8, third servo loop amplifier 9b and the said switching electronics 20 form a third servo control negative feedback loop which controls current flowing through resistor 8 to be approximately constant at least during a third period.

Only one of switch 23, switch 25 and switch 21 is closed at any instant and only one of switch 24, switch 26 and switch 22 is closed at any instant. During the first period either switch 25 and switch 22 are closed, or switch 26 and switch 21 are closed. During the second period either, switch 23 and switch 26 or 22 are closed, or, switch 24 and switch 25 or 21 are closed.

Receive coil 29 receives a magnetic field via receive inductor 12 under the influence of an alternating magnetic field generated by the transmit coil 1. Receive coil 29 is connected to an amplifier 13 whose output is connected to synchronous demodulators 14 which are controlled by the timing electronics 16 via control lines 18. An output of synchronous demodulators 14 is connected to further receive electronics processing 15 which includes an indicator output 10. Amplifier 13, synchronous demodulator 14 and further receive electronics processing 15 may be said to form receive electronics 11. Transmit coil 1 and receive coil 12 may be said to form a metal detector sensing coil 19. The synchronous demodulation may include similar principles of U.S. Pat. No. 6,636,044.

The first power source 5a and third power source 5b may be combined into a single power source, a first combined power source, wherein its output is controlled to produce an output when switch 21 is closed during a first period at a voltage controlled by an output of the first servo loop amplifier 9a, and when switch 22 is closed during a 5 third period, the output voltage of the combined first power source is controlled by an output of the third servo loop amplifier 9b. The second power source 6a and fourth power source 6b may be combined into a single power source, a second combined power source, wherein its output may be controlled by an output of a single servo loop amplifier which monitors a voltage output of the second combined power source 0 to form a servo control negative feedback loop to maintain the output of the second combined power source at an approximate constant voltage. However, the second combined power source may consist of a simple power supply regulated with a shunt constant voltage element, such as a zener diode for example, and have no need of any servo control negative feedback loop to maintain the output voltage.

The transmit electronics in FIG. 1 may generate a transmit signal which, when applied to the transmit coil 1, may transmit for example a bipolar alternating magnetic field containing at least a first period with a reactive transmit coil voltage to be approximately constant and approximately equal to zero whilst a transmit coil current is non-zero.

Figure 2:
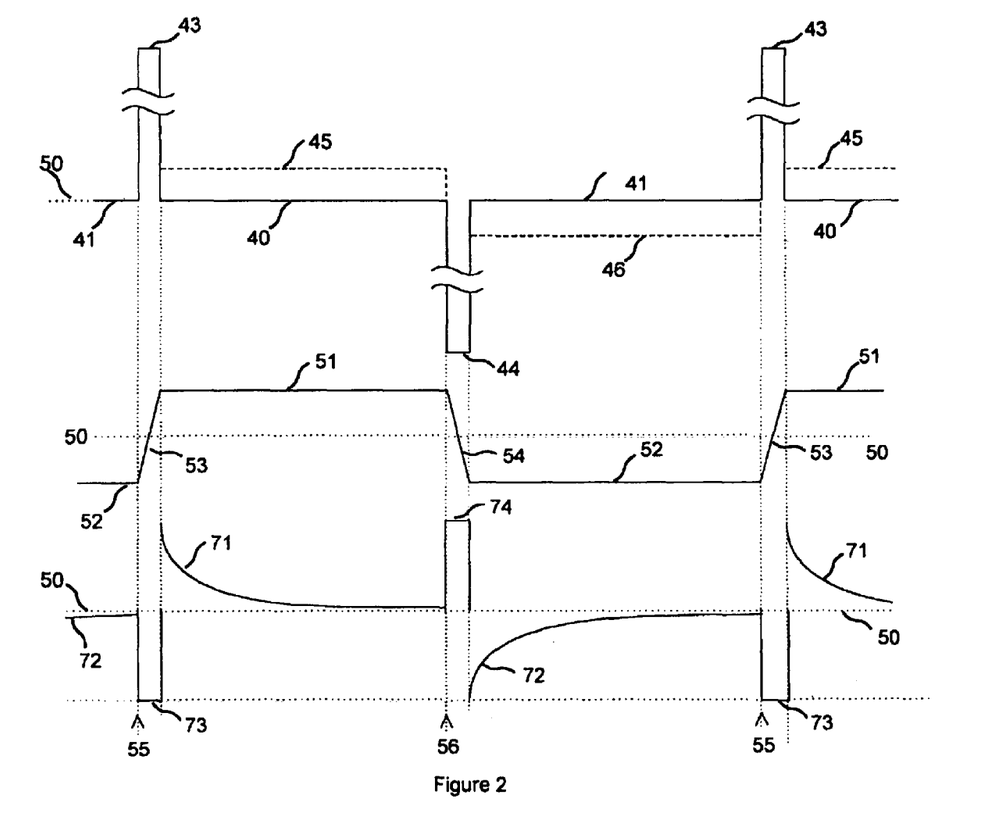
FIG. 2 is an example of possible transmit and receive waveforms for FIG. 1; this example being an approximate transmit coil current square-wave.

To assist with the understanding of the operation of the FIG. 1, FIG. 2 shows an example of possible signal waveforms. A time axis 50 is shown in each graph. FIG. 2 is an example of a transmit waveform symmetric both in time and polarity, which in this example, produces an approximate transmit coil current square-wave 51, 52, 53 and 54. Waveform 40, 41, 43 and 44 shows the reactive transmit coil voltage. A first period commencing at the transition between 43 and 40 and terminating at time 56, the transition between 40 and 44, is a period with zero reactive transmit coil voltage 40 whilst a non-zero constant transmit coil current 51 flows. Similarly in reversed transmit coil current flow sense compared to the first period, a third period commencing at the transition between 44 and 41 and terminating at time 55, the transition between 41 and 43, is another period with zero reactive transmit coil voltage 41 whilst a non-zero constant transmit coil current 52 flows. During the first period, the first power source 5a is applied to the transmit coil, with for example switch 21 closed and switch 23 and switch 25 open. The opposite end of the transmit coil is connected to the system ground 4 via resistor 8 and via switch 26 being on, and switch 24 and switch 22 being off. The actual voltage applied across the transmit coil 45 during the first period is approximately the reactive transmit coil voltage 40 plus a voltage resulting from the transmit coil current flowing through the transmit coil effective resistance 3. During a second period between time 56 and the transition between 44 and 41, the transmit coil is switched to the second power source 6a. This is shown as 44 in FIG. 2 and is reduced in scale for clarity. During the second period, the reactive voltage across the transmit coil is roughly the same as the actual voltage across the transmit coil, assuming that this voltage is much higher than the voltage applied across the transmit coil 45 during the first period. During this second period, switch 23 is closed and switch 21 and switch 25 are open. The opposite end of the coil may be switched to either the system ground 4 via resistor 8, with switch 26 closed and switch 22 and switch 24 open, or to the first power source 5b with switch 22 closed and switch 26 and switch 24 open. Alternatively, during the second period, this end of the coil may be switched to the second power source for some of the second period and system ground for a different period within the second period. The transmit coil is switched to the third power source 5b in a reverse polarity sense 46 to 45 during a third period. During the third period, the third power source 5b is applied to the transmit coil, with for example switch 22 closed and switch 24 and switch 26 open. The opposite end of the transmit coil is connected to the system ground 4 via resistor 8 and via switch 25 being on, and switch 23 and switch 21 being off. During a fourth period between time 55 and the transition between 43 and 40, the transmit coil is switched to the fourth power source 6b in a reverse polarity sense to the second period. This is shown as 43 in FIG. 2 and is reduced in scale for clarity. During the fourth period, the reactive voltage across the transmit coil is roughly the same as the actual voltage across the transmit coil assuming this voltage is much higher than the voltage applied across the transmit coil 46 during the third period. During this fourth period, switch 24 is closed and switch 22 and switch 26 are open. The opposite end of the coil may be switched to either the system ground 4 via resistor 8, with switch 25 closed and switch 21 and switch 23 open, or to the first power source 5a with switch 21 closed and switch 25 and switch 23 open. Alternatively, during the fourth period, this end of the coil may be switched to the first power source for some of the fourth period and system ground for a different period within the fourth period. The transmit coil approximately square-wave has transitions 54 and 53 occurring during the second and fourth periods when the transmit coil is connected to the second power source 6a and the fourth power source 6b. Fine details of the waveforms shown in FIG. 2 are not shown such as low level transmit coil current ringing associated with switching due to transmit coil and electronics capacitances and inductances, and such as switching "glitches." The slew rate during current changes 54 and 53 is approximately proportional to a voltage of the said second power source switched to the transmit coil during the second period and a voltage of the said fourth power source switched to the transmit coil during the fourth period respectively. In FIG. 2 received signal decays 71 and 72 from magnetic soils are shown, as too is a soil signal 73 and 74 during the second and fourth periods.

In FIG. 2, the currents of 51 and 52 are assumed to be of the same magnitude. However, unless they are controlled to be so, there is nothing to constrain an arbitrary offset current which might drift. If, say, the duration of the second period is fixed, and the duration of the fourth period may be controlled, and if a difference in value between the transmit coil current between the first period and the third period is monitored by a fourth servo-loop amplifier 19 which by controlling the ratio of the fourth period to the second period duration controls the ratio of energy transferred to the transmit coil during the second period and the fourth period. The fourth servo-loop amplifier 19, timing control electronics 16, control lines 17, switching electronics 20 and power sources form a fourth servo control negative feedback loop which controls the said difference in absolute values between the transmit coil current during the first period and the during the third period to be approximately zero.

The example waveforms shown in FIG. 2 is a useful waveform and may be thought of as "pulse induction like," but with finite transmit current flow during suitable periods of resistive synchronous demodulation, namely the first and third periods.

For direct comparison of the waveforms in FIG. 2 with a similar pulse induction system, assume for the pulse induction system that the power consumed in the transmit coil is the same for the waveforms in FIG. 2 and the pulse induction system. Assume that the pulse induction "on" time is during the first period with −V volts (e.g. −5V) applied to the transmit coil, the back-emf occurs approximately during the second period (e.g. +200V), and the zero transmit coil current during the receive third and fourth period. Assume ideal component behaviour with the transmit coil current approximately a linear ramp, with the reactive transmit coil voltage during the first period assumed to be approximately constant, and back-emf period assumed to be of "zero" duration. Assume the first, second, third and fourth period form a repeating sequence.

As described in U.S. Pat. Nos. 5,576,624, 5,537,041, and 6,636,044, the total integrated synchronous demodulation linear combination must equal zero in order to cancel out environmental static magnetic fields and 1/f electronic noise. As this must occur in just the third and fourth period of a pulse induction system compared to both the first and third period with the advantage of opposite polarity in the transmit coil current square-wave system, less long time constant target attenuation occurs from the latter system compared to the former system. In addition, as there are 2 periods of high voltage in the transmit coil current square-wave system compared to the pulse induction system, the resistive signal from fast time constant targets is roughly improved by 4/SQRT(6) for the same power consumed in the transmit coil. Hence the target response is generally improved. In addition, if the synchronous demodulation gain profile is symmetric in the transmit coil current square-wave system, then even noise harmonics of the fundamental frequency are cancelled thus offering more immunity to environmental noise.

A bi-polar pulse induction system does not fare significantly better.

Assuming that the losses in the switching electronics are small and the power sources efficient (e.g. switch mode power supplies with synchronous rectifiers) and the voltage drop across any series linear regulator in the first power source is small (few $1/10^{th}$ of a Volt), this transmit coil square-wave current system must be nearly optimal in target signal-to-noise ratio for a large range of time constant targets for a given transmit power dissipation and a system suitable for cancelling out magnetic soil signals with resistive synchronous occurring during periods of zero transmit coil reactive voltage.

The signal from magnetic soil components during the third period from a single second period (44) followed by the said third period is proportional to 1/t assuming the second period is effectively of "zero" duration, and assuming the soils have constant valued resistive components to very high frequencies.

For a continuous repeating sequence of FIG. 2, the signal is approximately proportional to $1/t-2/(3(t+T))$ where T equals the duration of each of the first and third periods.

Figure 3:
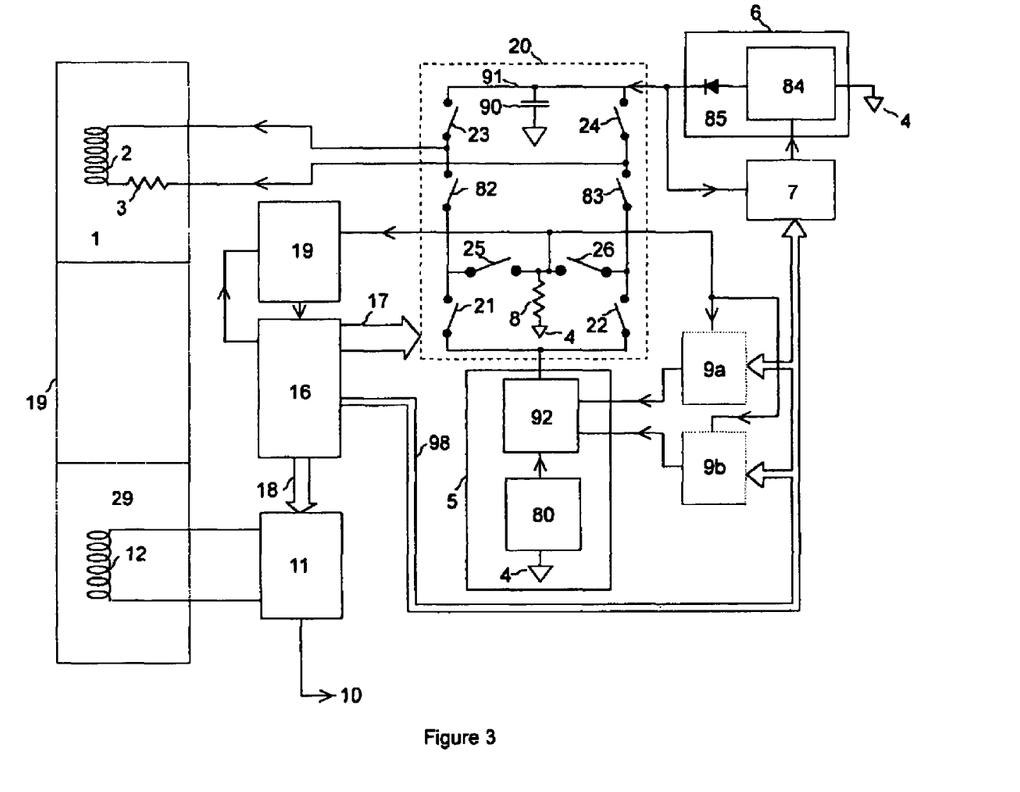
FIG. 3 is an example of an electronics system with more detail than FIG. 1.

FIG. 3 shows an expanded block diagram of FIG. 1. Many of the elements are labelled the same as in FIG. 1 as these perform the same function. Two extra switches 82 and 83 are included in the switching electronics for practical reasons, mostly because of the parallel diodes in FET switches 25 and 26, assuming these are FETs. Switch 82 and switch 83 are also controlled by the timing electronics 16 via control lines 17. Control lines 98 control the operations of servo-loop amplifiers 9a, 9b, 95 and 96 and the effects of 9a and 9b through the control of switch 97.

A power supply 80 (e.g. a switch mode power supply) in the first power source 5 may have an output which varies slightly as the transmit coil current changes. Hence for practical reasons, the first power source 5 should include electronic circuitry whose output is of low impedance and whose output voltage switched to the transmit coil during the first period and third period may change at a substantially faster rate than any variation in the output of power supply 80. This may be implemented by the first power source 5 including a series linear regulator 92 (such as a series FET plus operational amplifier for example) whose output voltage is controlled by an output of the servo-loop amplifier 9a during the first period when switches 21, 26 and 82 are closed, and an output of the servo-loop amplifier 9b during the third period when switch 22, 25 and 83 are closed, where the output of the series linear regulator 92 connected to switch 21 and switch 22 may be tightly voltage controlled via a fast local negative feedback loop formed using the said operational amplifier for example. Hence the first power source 5 of low impedance has an output connected to the switching electronics which may include a series linear regulator 92 including a local negative feedback loop.

The voltage of the second power source 6 is shown as 43 and 44 (second and fourth periods) with a change in scale assuming that this voltage is relatively high (e.g. 200V). Not shown is fine waveform detail, in particular, assuming the value of storage capacitor 90 is relatively low value (e.g. 2.2 microFarad), the peaks of the waveforms 43 and 44 should show roughly small parabolic waveforms as the capacitor initially charges then discharges. Assuming that the second power source 6 contains a switch mode power supply 84, an output rectifying diode 85 is shown. The voltage across capacitor 90 is controlled by servo-loop amplifier 7 controlling power supply 84. The servo loop amplifier monitors the voltage across capacitor 90 via connection 91.

The receive electronics 11 processors a receive signal from the said received magnetic field such that the indicator output 10 is responsive to metal targets but not receive signals from magnetic soils which may include ferrimagnetic materials in accordance with similar principles disclosed in U.S. Pat. No. 5,576,624. Resistive receive signals may be generated by receive synchronous demodulation during the second and fourth periods as the transmit reactive voltage is approximately zero.

As transmit electronics which generates a transmit signal repeating sequence applied to the transmit coil as the electronics is not perfect, in order to reduce any inaccuracies in the waveform, each "independent" variable should be controlled with different servo control negative feedback loops.

In order to accurately ensure the reactive transmit coil voltage to be constant and approximately equal to zero whilst a transmit coil current is non-zero and constant for the receive resistive synchronous demodulation periods, whilst rapidly tracking changes in the inductance of the transmit coil, advantage may be gained by the use of sample-and-hold elements, for example, at the output of servo loop amplifiers which may be controlled by the timing electronics 16 via control lines 82. Thus the transmit electronics may include at least one sample-and-hold element which feeds a first output signal to a control input of at least the first power source which controls the output of the first power source 5 during at least the first period, such that the said first output signal voltage is held constant during the first period. Similarly a sample-and-hold element in the output of the third servo loop amplifier may control the constant output of the first power source during the third period.

Suppose the transmit waveform consists of a repeating sequence of say a first period where a first constant low voltage (from the first power source, e.g. 45 in FIG. 2 of say u=+1 Volt) is applied to the transmit coil of a first polarity, followed by a second high voltage during a second period of short duration (say Ts) and of a second polarity (from the second power source, e.g. 44 in FIG. 2 of say −V=−200 Volt), followed by third period where a third constant low voltage (from the first power source, e.g. 46 in FIG. 2 of say −u=−1 Volt) is applied to the transmit coil of second polarity, followed by a fourth high voltage during a fourth period of short duration (say Ts) and of a first polarity (from the second power source, e.g. 43 in FIG. 3 of say +V=+200 Volt), and then this sequence repeated. If the average transmit current for each complete sequence is zero, and the transmit coil current is constant during the first period (e.g. say 51 in FIG. 2 of value +I) and third period (e.g. 52 in FIG. 2 of value -I) which results in a constant zero reactive transmit coil voltage (e.g. 40 and 41 in FIG. 2), then as the voltage applied across the coil during the second and fourth periods (+/−200V) is high compared to any voltage drop across effective resistance component impedance 3 (<=|1V|), the reactive transmit coil voltage approximately equals the voltage across the transmit coil 1. Thus when this relatively high voltage is applied across the transmit coil during the second or fourth period, the instantaneous reactive transmit coil voltage is approximately defined and independent of the instantaneous effective inductive component impedance 2 which may be under the influence of magnetic soils and thus altering as the coil moves relative to the magnetic soils. Hence it is useful if the voltage of the second power source is more than a factor of 10 that of the voltage of the first power source. The change in transmit current during the fourth period is $\Delta I = +VTs/L = +I - -I = 2I$, where L is the transmit coil inductance which may vary as the coil moves relative to magnetic soils. As L may vary, so too will $\Delta I$ assuming Ts and V are constant, and hence so too does I vary in proportion to 1/L. Thus u must also vary in proportion to 1/L as the voltage across the transmit coil u=IR if the reactive voltage is zero, where R is the effective resistive component impedance 3. A similar explanation applies to the second period.

The response time of a transmit electronics system combination including all the servo control negative feedback loops, must operate significantly faster, that is operate up to an effective higher frequency than an information frequency bandwidth of the indicator output, that is in essence the effective frequency information bandwidth at the output of resistive signals including low pass filtering that is passed to an indicator output. This is because the response of the servo loops to correct say an inductance of the transmit coil altered by a varying proximity of the transmit coil to magnetic soils must rapidly track such changes so that the effect of these changes does not significantly contribute to an indicator output signal.

Unlike a pulse induction system, this transmit coil current square-wave system transmits a magnetic field whilst receiving resistive components, and these synchronous transmitted finite magnetic fields may induce a rate of change of flux signal as the coupling between the transmit coil transmitted alternating magnetic field and a magnetic field received and processed by the receive electronics alters when for example, the coupling is modulated by the varying interrogation of magnetic soils. This component rate of change of receive resistive signal needs to be cancelled to stop it contaminating an indicator output signal. A reactive receive signal may be formed by synchronously demodulating a receive signal during a period when the reactive transmit coil voltage is non-zero, for example during the second period and fourth period. To effect this said cancellation, the reactive receive signal is further processed by the receive electronics to be approximately differentiated to give a differentiated reactive receive signal, and a linear combination of the differentiated reactive receive signal and the resistive receive signal is selected so that a component of the said resistive receive signal that is responsive to magnetically permeable material rate of change of coupling between the transmit coil transmitted alternating magnetic field and a magnetic field received and processed by the receive electronics is approximately cancelled, and the resultant linear combination is further processed by the receive electronics to give an indicator output.

Figure 4:
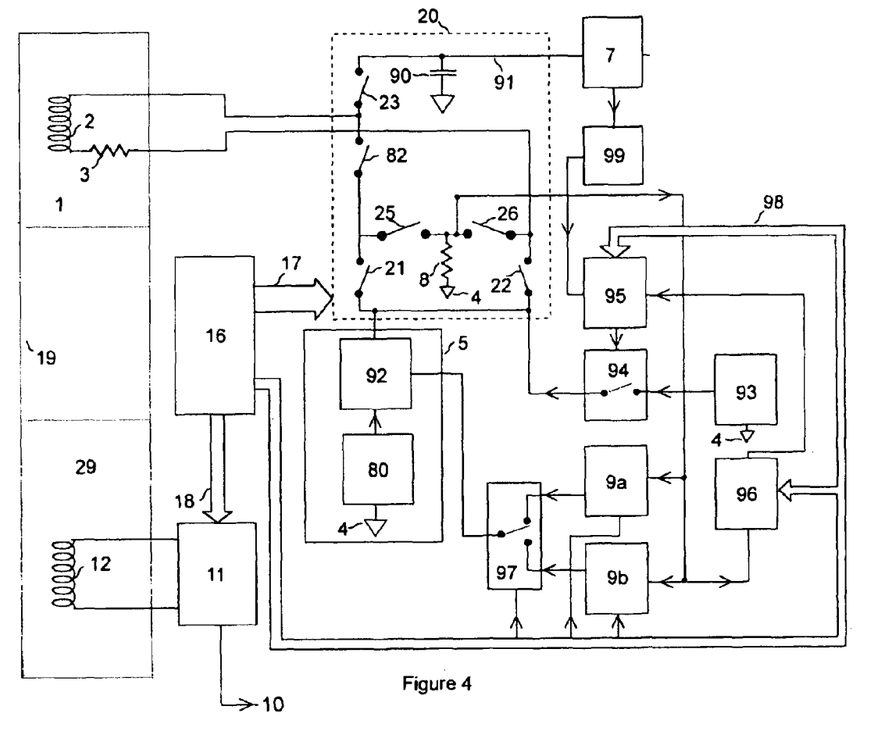
FIG. 4 is another example of a preferred embodiment of this invention.
Figure 5:
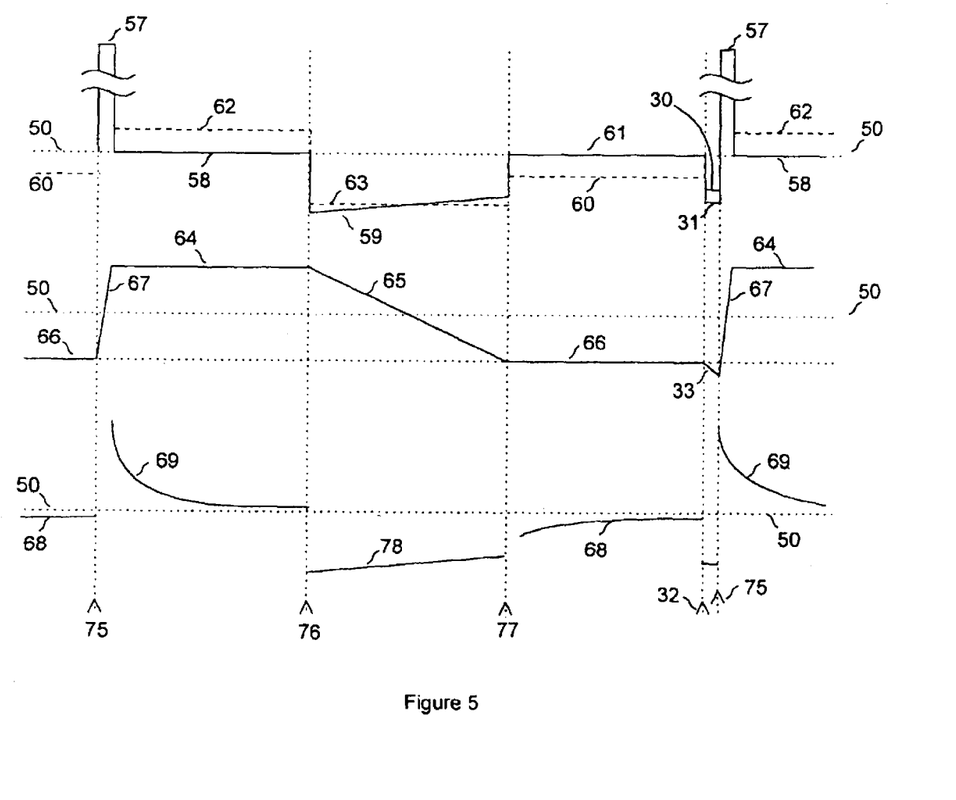
FIG. 5 is an example of possible transmit and receive waveforms for FIG. 4.

FIG. 5 shows another example of transmit waveforms which includes a first period and a third period of zero reactive transmit coil voltage, 58 and 61, whilst a non-zero, constant transmit coil current flows, 64 and 66, which may be implemented in FIG. 4. This includes the switching electronics 20 in FIG. 4 switching a fifth power source 93 to the transmit coil via switch 94 and via switch 21 or switch 22, and switch 82 or switch 83, during a fifth period, such that the transmit coil current 65 changes sign during the fifth period when an output voltage 63 of the fifth power source 93 (e.g. −5 Volt) switched to the transmit coil during the fifth period is greater in absolute magnitude to a voltage of the first power source switched to the transmit coil during the first period (e.g. 1 Volt), and less than an absolute magnitude of a voltage of the second power source switched to the transmit coil during the second period (e.g. 200 Volt). A switch 97 is used to control the periods for which the outputs of the servo-loop amplifiers 9a and 9b control the output voltage of the series linear regulator 92. The fifth power source is connected to the system ground 4. FIG. 5 shows the voltage 60 applied to the transmit coil for the first period, and the voltage 62 applied to the transmit coil for the third period, and the voltage 57 applied to the transmit coil for the second period. The fifth period is defined between times 76 and 77. The transmit coil reactive voltage 59 of the transmit coil during the fifth period is proportional to exp(−t/τ). The transmit coil current during the fifth period is Io+V/R(1−exp(−t/τ)) where V is the output voltage of power source 93 switched to the transmit coil and Io is the initial current of the fifth period.

The receive voltage signal 68 across receive coil 12 from magnetic soils from a single fifth period pulse during the first period is approximately proportional to −exp(−(T+t)/τ)log((t+T)/t) across the receive inductor 12, where T is the duration of the fifth period. The actual receive signal from a repeated transmit waveform sequence also includes the decaying signals from previous transmissions.

The advantage of such a waveform wherein an output voltage of the fifth power supply switched to the transmit coil during the fifth period is greater in absolute magnitude to a voltage of the first power source switched to the transmit coil during the first period, and less that an absolute magnitude of a voltage of the second power source switched to the transmit coil during the second period, such as −5 Volts, is that the receive waveform form magnetic soils is very different between the first 68 and third 69 periods, thus potentially improving the capability of discriminating between metal targets and magnetic soils. Also, as described in U.S. Pat. No. 5,576,624 and U.S. Pat. No. 5,537,041, ferrous metal targets may be relatively well discriminated from non-ferrous targets if a reactive signal is derived from synchronously demodulating during the latter half of the fifth period. The signal 78 from magnetic soils during period 5 is shown in FIG. 5.

A servo control negative feedback loop is required for each "independent" variable of the transmit signal repeating sequence for best control of the transmit coil reactive voltage during the first and third periods. Hence for example, for the transmission of the waveform shown in FIG. 5, assuming that the voltage and duration of the second period, and the voltage at the output of the fifth power source are fixed, then the following variables may be controlled by individual servo loops: the voltage 60 of the first power source 5 applied to the transmit coil during the first period, the voltage 62 of the first power source 5 applied to the transmit coil during the third period, and the duration of the fifth period when the fifth power source is switched to the transmit coil.

A fifth servo loop amplifier 96 monitors a difference in transmit coil current between the first period and the third period. An output of the fifth servo loop amplifier 96 is connected to a controlled duration timer 95 which includes an input selector. An output of the controlled duration timer 95 controls switch 94 to be on during the fifth period. The controlled duration timer 95, fifth servo loop amplifier 96, switch 94, switching electronics 20, and fifth power supply 93 form a fifth servo control negative feedback loop which maintains the difference in transmit coil current between the first period and the third period to be approximately zero.

A second servo loop amplifier 99 monitors the output voltage of the second power source which includes a first capacitor 90 which is charged only by energy from the back emf of the transmit coil when the transmit coil is switched to the said first capacitor 90 during the second period. An output of the second servo loop amplifier 96 is connected to a controlled duration timer 95 which includes an input selector. An output of the controlled duration timer 95 controls switch 94 to be on during sixth period between 32 and 75 in FIG. 5. During the sixth period, the fifth power supply is switched to the coil as shown by the applied transmit coil voltage 31, and the transmit coil current 33 increases absolutely. The controlled duration timer 95, second servo loop amplifier 99, switch 94, switching electronics, and fifth power supply 93 form a second servo control negative feedback loop. The increase in energy stored in the transmit coil resulting from the said increase in transmit coil current during the sixth period is discharged during part of at least the second period into the said first capacitor such that energy lost during the second period in the transmit coil and also in the switching electronics associated with switching the transmit coil to the first capacitor 90, is compensated by the said increase in energy stored in the transmit coil resulting from the said increase in transmit coil current. The second servo control negative feedback acts to maintain the voltage across capacitor 90 constant. The power supply connected to the transmit coil during the sixth period may be a different power supply to the fifth. The transmit coil reactive voltage during the sixth period is shown as 30 in FIG. 5.

Hence the transmit electronics is arranged and adapted to comprise at least different servo control negative feedback loops to control the transmit waveform such that reactive transmit coil voltage is controlled to be constant and approximately equal to zero whilst a transmit coil current is non-zero during periods when the receive electronics is arranged and adapted to synchronous demodulate receive resistive components, such as during the first and third periods for example.

Varying the duration of the fifth period when the fifth power source is switched to the transmit coil is not ideal, but in practice power efficient, inexpensive and gives satisfactory performance. A better solution for this situation is disclosed in WO 2005/047932, but this is more expensive and less power efficient. If the repeated transmit signal voltage waveform is that given in FIG. 5 and the voltages 57, 62, 60 are the same as 43, 45 and 46 respectively as above, the change in current ΔI during the fifth period must equal the change in current during the second period and thus is also proportional to 1/L.

In an alternative preferred embodiment power source 5 may be a controlled current source, but a system employing such a system exhibits ring transients from the transmit coil associated resonance.

Note that the roles of various servo control negative feedback loop may be altered, which form combined servo-loop systems.

The invention claimed is:
1. An electronic metal detector having
a transmit coil arranged and adapted to transmit an alternating magnetic field associated with a reactive transmit coil voltage,
the transmit coil is connected to transmit electronics arranged and adapted to generate a transmit signal,
the transmit electronics having at least two power sources, a first power source and a second power source,
wherein the first power source being adapted and arranged to connect to the transmit coil for at least a first period, and the second power source being adapted and arranged to connect to the transmit coil for at least a second period,
said transmit electronics comprising at least one servo control negative feedback loop, a first servo control negative feedback loop, which is adapted and arranged to monitor a transmit coil current for at least part of said first period, and to control at least part of said transmit signal, the transmit electronics being adapted and arranged to control the transmit signal to produce the reactive transmit coil voltage to be approximately constant and approximately equal to zero whilst the transmit coil current is non-zero and approximately constant for at least part of the first period, receive electronics adapted and arranged to receive and process a receive magnetic field during at least some of the first period to produce an indicator output.

2. An electronic metal detector as in claim 1,
wherein said transmit electronics comprising switching electronics is adapted and arranged to connect a switching signal to the transmit coil,
the switching electronics is adapted and arranged to switch the first power source to the transmit coil during at least said first period,
the first power source is adapted and arranged to produce an approximately constant voltage,
the switching electronics is adapted and arranged to switch the second power source to the transmit coil during at least said second period,
the second power source is adapted and arranged to produce an approximately constant voltage.

3. An electronic metal detector as in claim 2,
wherein the transmit electronics is arranged and adapted such that said voltage of the second power source switched to the transmit coil during the second period is opposite in sign to a voltage of the first power source switched to the transmit coil during the first period,
and an absolute voltage magnitude of the second power source switched to the transmit coil during the second period is a least ten times an absolute voltage magnitude of the first power source switched to the transmit coil during the first period,
and the transmit coil current changes sign during the second period.

4. An electronic metal detector as in claim 2,
wherein the switching electronics is adapted and arranged to switch a fourth power source to the transmit coil for at least a fourth period in reverse voltage polarity compared to that during said second period,
such that said first period, second period and fourth period, and first power source, second power source and fourth power source are arranged and adapted so that the transmit coil current changes sign during the fourth period from a second polarity to a first polarity,
and the transmit coil current changes sign during said second period from a first polarity to a second polarity.

5. An electronic metal detector as in claim 4,
wherein the second power source and the fourth power source are the same.

6. An electronic metal detector as in claim 4,
wherein the transmit electronics is adapted and arranged to produce a transmit coil current to be approximately a square-wave waveform with a slew rate during current changes to be approximately proportional to a voltage of said second power source switched to the transmit coil during the second period and a voltage of the said fourth power source switched to the transmit coil during the fourth period.

7. An electronic metal detector as in claim 1,
wherein the first servo control negative feedback loop is adapted and arranged to control the transmit coil current to be approximately constant during the first period.

8. An electronic metal detector as in claim 1,
wherein the switching electronics is adapted and arranged to switch a third power source to the transmit coil during a third period,
the transmit electronics is adapted and arranged to control the transmit signal to produce a reactive transmit coil voltage to be approximately constant and approximately zero whilst the transmit coil current is non-zero and approximately constant during the third period,
and such that the transmit coil current during said third period is opposite in sign to the transmit coil current during the first period.

9. An electronic metal detector as in claim 8,
wherein the transmit electronics includes a third servo control negative feedback loop adapted and arranged to monitor the transmit coil current during the third period,
the third servo control negative feedback loop is adapted and arranged to control a voltage of the third power source switched to the transmit coil during the third period such that the transmit current during the third period is controlled to be approximately constant.

10. An electronic metal detector as in claim 8,
wherein the transmit electronics includes at least a fourth servo control negative feedback loop adapted and arranged to monitor a difference in absolute value of the transmit coil current between the first period and the third period,
the fourth servo control negative feedback loop is adapted and arranged to controls the ratio of energy transferred to the transmit coil during the second period and the fourth period such that a difference in absolute value between the transmit coil current between the first period and the third period is approximately zero.

11. An electronic metal detector as in claim 8,
wherein the first power source and the third power source are the same.

12. An electronic metal detector as in claim 8,
wherein the receive electronics is adapted and arranged to receive and process a receive magnetic field to produce an effective information frequency bandwidth of the indicator output,
the transmit electronics includes a third servo control negative feedback loop adapted and arranged to monitor the transmit coil current during the third period,
the third servo control negative feedback loop is adapted and arranged to control a voltage of the third power source switched to the transmit coil during the third period such that the transmit current during the third period is controlled to be approximately constant
wherein the transmit electronics includes at least a fourth servo control negative feedback loop adapted and arranged to monitor a difference in absolute value of the transmit coil current between the first period and the third period,
the fourth servo control negative feedback loop is adapted and arranged to controls the ratio of energy transferred to the transmit coil during the second period and the fourth period such that a difference in absolute value between the transmit coil current between the first period and the third period is approximately zero,
the transmit electronics is arranged and adapted such that a response time of a combination including said first servo control negative feedback loop, third servo control negative feedback loop, and fourth servo control negative feedback loop operates up to higher frequencies than the effective information frequency bandwidth of the indicator output.

13. An electronic metal detector as in claim 12,
wherein the receive electronics is arranged and adapted to process a receive signal from said received magnetic field such that the indicator output is responsive to metal targets but approximately not responsive to receive signals from magnetic soils which may include ferrimagnetic materials,
and wherein said servo control negative feedback loops are arranged and adapted to act to maintain an approximate constant reactive transmit coil voltage waveform when an inductance of the transmit coil is altered by a varying proximity of the transmit coil to said magnetic soils.

14. An electronic metal detector as in claim 8
wherein receive electronics is adapted and arranged to receive and process a receive magnetic field during at least some of the third period to produce an indicator output.

15. An electronic metal detector as in claim 1,
wherein the switching electronics is adapted and arranged to switch a fifth power source to the transmit coil during a fifth period,
the switching electronics is adapted and arranged such that the transmit coil current changes sign during the fifth period and an output voltage of the fifth power supply switched to the transmit coil during the fifth period is greater in absolute magnitude than the voltage of the first power source switched to the transmit coil during the first period, and less than the absolute magnitude of the voltage of the second power source switched to the transmit coil during the second period.

16. An electronic metal detector as in claim 15,
wherein the second power source includes at least a first capacitor,
the first capacitor is arranged and adapted to be charged only by energy from the back emf of the transmit coil when the transmit coil is switched to said second power source,
wherein the fifth power source is arranged and adapted to be switched to the transmit coil for a sixth period,
and a voltage of the fifth power source switched to the transmit coil for the sixth period is selected so that the transmit coil current increases absolutely,
such that an increase in energy stored in the transmit coil resulting from said increase in transmit coil current is discharged during part of at least the second period into said first capacitor such that energy lost during the second period in the transmit coil and also in the switching electronics associated with switching the transmit coil to the first capacitor is compensated by said increase in energy stored in the transmit coil resulting from said increase in transmit coil current.

17. An electronic metal detector as in claim 1,
wherein the transmit electronics is arranged and adapted such that the transmit signal consists of a repeating sequence containing a least said first period and said second period within each said repeating sequence.

18. An electronic metal detector as in claim 1,
wherein the transmit electronics is arranged and adapted such that the first power source has an output of low impedance connected to the switching electronics,
the first power source may include a series linear regulator including a local negative feedback loop,
and a voltage at said output of said series linear regulator may be controlled.

19. An electronic metal detector as in claim 1,
wherein the transmit electronics is arranged and adapted to generate a transmit signal repeating sequence applied to the transmit coil,
and the transmit electronics is arranged and adapted to includes at least different servo control negative feedback loops to control the transmit waveform such that reactive transmit coil voltage is controlled to be constant and approximately equal to zero whilst a transmit coil current is non-zero during periods when the receive electronics is arranged and adapted to synchronous demodulate receive resistive components.

20. An electronic metal detector as in claim 1,
wherein the receive electronics is arranged and adapted to process said received magnetic field such that
a signal component received and synchronously demodulated during a period when the reactive transmit coil voltage is non-zero produces a reactive receive signal,
and a signal component received and synchronously demodulated during at least part of the first period produces a resistive receive signal,
the receive electronics is arranged and adapted such that the relative timing and gain of the synchronous demodulation of said resistive receive signal is selected such that said resistive receive signal is approximately intrinsically statically insensitive to signals from magnetic soils but is responsive to magnetically permeable material rate of change of coupling between the transmit coil transmitted alternating magnetic field and a magnetic field received and processed by the receive electronics,
the receive electronics is further arranged and adapted to approximately differentiate the reactive receive signal to produce a differentiated reactive receive signal,
and the receive electronics is arranged and adapted to produce a linear combination of the differentiated reactive receive signal and the resistive receive signal selected so that a component of said resistive receive signal that is responsive to magnetically permeable material rate of change of coupling between the transmit coil transmitted alternating magnetic field and a magnetic field received and processed by the receive electronics is approximately cancelled,
the reactive receive signal is arranged and adapted to further process the resultant linear combination to produce an indicator output.

21. An electronic metal detector as in claim 1,
wherein the transmit electronics includes at least one sample-and-hold element which provides a first output signal to a control input of at least the first power source which is arranged and adapted to control an output voltage of the first power source during at least the first period,
such that said first output signal is held constant during each first period in a transmit signal repeating sequence.

22. An electronic metal detector as in claim 1,
wherein the second power source includes at least a first capacitor,
the first capacitor is arranged and adapted to be charged only by energy from the back emf of the transmit coil when the transmit coil is switched to said second power source.

23. An electronic metal detector as in claim 1,
wherein said first power source is arranged and adapted to produce an approximate current source.

* * * * *

UNITED STATES PATENT AND TRADEMARK OFFICE
CERTIFICATE OF CORRECTION

PATENT NO.         : 7,924,012 B2
APPLICATION NO.    : 12/373046
DATED              : April 12, 2011
INVENTOR(S)        : Bruce Halcro Candy It is certified that error appears in the above-identified patent and that said Letters Patent is hereby corrected as shown below:

In The Specification:

1. Column 1, line 24, remove the word "or"
2. Column 1, line 27, change "and" to -- or --
3. Column 1, line 31, change "consists" to -- consist --
4. Column 1, line 40, change "hand-held" to -- hand-held, --
5. Column 1, line 40, change "battery operated" to -- battery-operated --
6. Column 1, line 44, change "processors" to -- processes --
7. Column 2, line 27, remove "and some resistive elements of the transmit electronics"
8. Column 4, line 57, change "8 and" to -- 8, --
9. Column 4, line 58, change "respectively" to -- respectively, --
10. Column 5, line 51, remove "5"
11. Column 5, line 58, remove "0"
12. Column 6, line 42, change "first" to -- third --
13. Column 6, line 44, change "second" to -- third --
14. Column 6, line 48, change "46 to 45" to -- 46 compared to 45 (when switched to the first power source) --
15. Column 7, line 20, change "same magnitude" to -- same absolute magnitude --
16. Column 8, line 28, change "1/t-2/(3(t+T))" to -- $\beta(t/T)$ where $\beta(t) = \{\Psi[(t+1)/2] - \Psi[t/2]\}/2$, $\Psi(t) = d\ln(\Gamma(t))/dt$, and --
17. Column 8, line 38, change "95 and 96 and the effects of 9a and 9b through the control of switch 97" to -- and 7 --
18. Column 9, line 14, change "second" to -- first --
19. Column 9, line 15, change "fourth" to -- third --

Signed and Sealed this
Twenty-third Day of August, 2011

David J. Kappos
*Director of the United States Patent and Trademark Office*

CERTIFICATE OF CORRECTION (continued)
U.S. Pat. No. 7,924,012 B2

In The Specification:

20. Column 9, line 29, change "82" to -- 98 --
21. Column 9, line 45, change "- V" to -- V --
22. Column 9, line 47, change "-u" to -- u --
23. Column 9, line 58, change "(+/-200V)" to -- ( -/+200V) --
24. Column 10, line 53, change "first" to -- third --
25. Column 10, line 53, change "third" to -- first --
26. Column 10, lines 58 and 59, remove "or switch 83"
27. Column 11, line 3, change "source is" to -- source 93 is --
28. Column 11, lines 10 and 11, change "$I_0+V/R(1-\exp(-t/\tau))$" to
    -- $I_0\exp(-t/\tau) + V/R(1-\exp(t/\tau))$ --
29. Column 11, lines 16 and 17, change "$-\exp(-(T+t)/\tau)\log((t+T)/t)$" to
    -- $\{Ei[t/T]-Ei[(t+1)/T]\}\exp[(-t+T)/\tau]$ where Ei is the exponential integral --
30. Column 11, line 51, change "coil current" to -- coil absolute current --
31. Column 11, line 66, change "second" to -- fifth --